Oct. 7, 1958     H. J. WHITE     2,855,142
BLOWER STRUCTURE FOR A GRAIN SEPARATOR
Filed Dec. 22, 1955
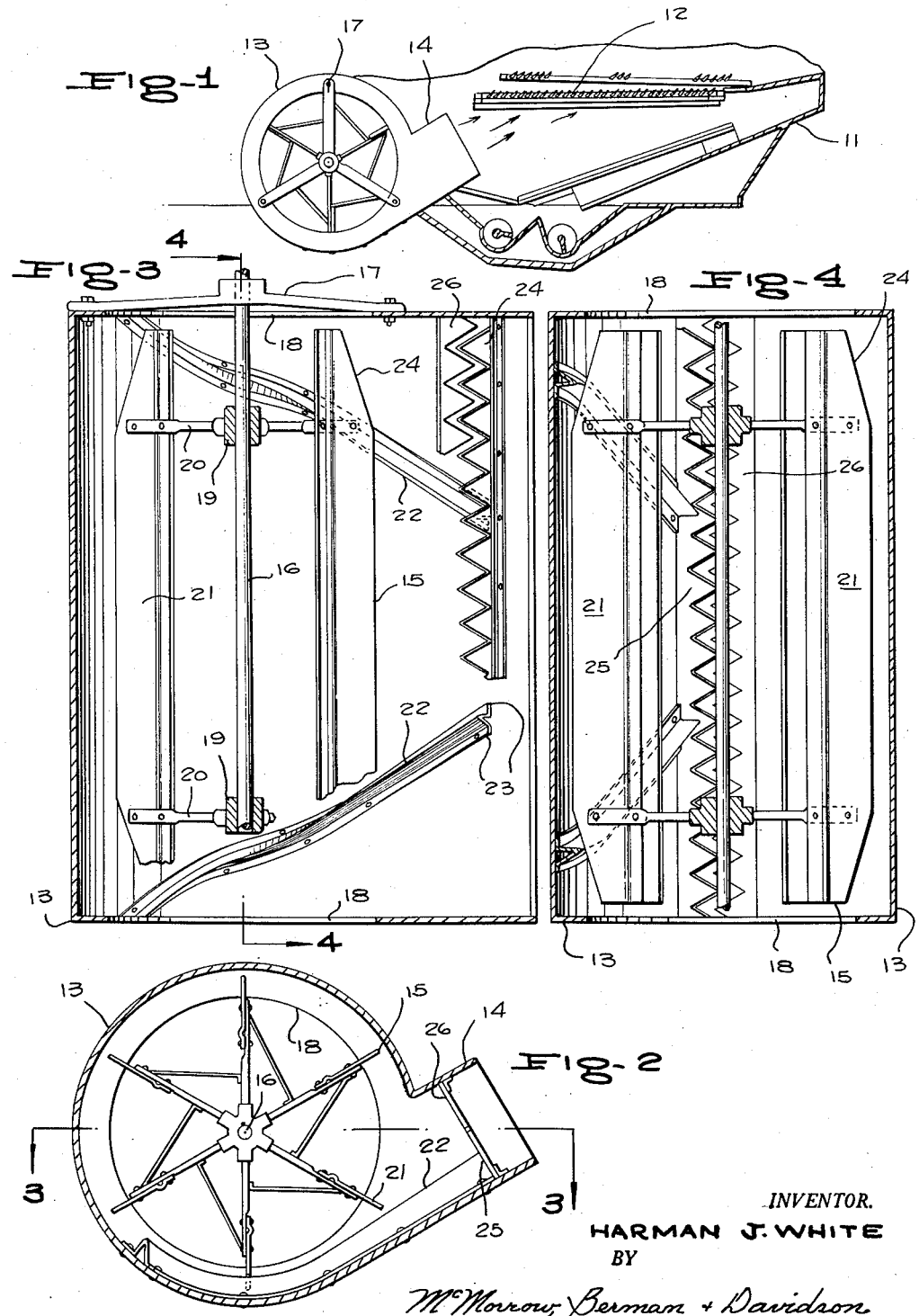
INVENTOR.
HARMAN J. WHITE
BY
McMorrow, Berman + Davidson
ATTORNEYS

United States Patent Office 2,855,142
Patented Oct. 7, 1958

2,855,142

BLOWER STRUCTURE FOR A GRAIN SEPARATOR

Harman J. White, Gatesville, Tex.

Application December 22, 1955, Serial No. 554,694

4 Claims. (Cl. 230—128)

This invention relates to grain separators, and more particularly to an improved blower assembly for use in a grain separator.

The main object of the invention is to provide a novel and improved blower assembly for use in a grain separator, said assembly involving relatively simple components, being easy to install, and providing an improved distribution of wind force acting under the sieve member of the grain separator in which the blower is installed, the wind force being distributed so that it moves with substantially the same velocity across the entire width of the grain sieve, providing increased efficiency in cleaning the grain and separating same.

A further object of the invention is to provide an improved blower assembly for use in a grain separator, said blower assembly involving inexpensive parts, being rugged in construction, and being provided with improved baffle means serving to equalize the velocity of the air moving through the outlet duct of the blower across the throat area of said outlet duct, so that the moving air strikes the grain sieve portion of the grain separator with substantially the same velocity over the bottom area of the sieve, thereby providing more efficient cleaning of the grain material on the sieve and saving a larger amount of the better quality grain as it passes over the sieve.

Further objects and advantages of the invention will become apparent from the following description and claims, and from the accompanying drawing, wherein:

Figure 1 is a fragmentary side elevational view of an improved blower assembly constructed according to the present invention, shown mounted on the lower portion of a grain separator, said lower portion of the separator being shown in vertical cross sectional view.

Figure 2 is an enlarged vertical cross sectional view taken through the blower assembly of Figure 1 perpendicular to its axis.

Figure 3 is a horizontal cross sectional view taken on the line 3—3 of Figure 2.

Figure 4 is a vertical cross sectional view taken on the line 4—4 of Figure 3.

Referring to the drawings, 11 generally designates a grain separator of generally conventional construction, said separator including a substantially horizontal sieve member 12 and a generally cylindrical horizontal air blower 13 mounted subjacent the sieve member 12 and having an air outlet duct 14 directed upwardly toward the sieve member, as shown in Figure 1.

Designated generally at 15 is the horizontal vaned rotor of the air blower 13, said rotor comprising a transverse horizontal shaft 16 which is journaled in respective spider brackets 17 secured to the opposite ends of the housing of the blower 13, one of said spider brackets being shown in Figure 3, the other spider bracket being omitted. The opposite end walls of the housing of the blower 13 are formed with the air inlet openings 18, 18, as shown.

Secured on the shaft 16 are a pair of collar members 19, 19, to which are rigidly secured the respective radial arms 20. The respective rotor vanes 21 are each secured to a respective pair of radial arms 20, 20, as is clearly shown in Figure 3.

The blower vanes 21 extend parallel to the shaft 16 and terminate short distances from the respective inlet openings 18 in the opposite end walls of the blower casing.

Designated respectively at 22, 22 are a pair of baffle members mounted on the bottom wall of the blower casing and extending into the bottom of the air outlet duct, the baffle members 22 extending from respective points rearwardly adjacent the air inlet openings 18 and converging toward the outlet duct 14, as is clearly shown in Figure 3. The baffle members 22 comprise respective, sinuously curved upstanding members of substantially inverted V shape, said members having respective bottom flanges 23, 23, by means of which the members are fastened to the bottom wall of the blower housing 13 and the bottom wall of the air outlet duct 14 which merges with the housing bottom wall.

As shown, the baffle members 22 gradually increase in height toward the outlet duct 14, having their maximum height at the discharge ends of said baffle members. As shown in Figure 3, the spacing between the discharge ends of the baffle members is substantially less than the length of the rotor vanes 21.

The outer corner portions of the rotor vanes 21 are cut away, as shown at 24, to provide clearance for the forwardly convergent baffle members 22, 22.

Mounted in the throat portion of the discharge conduit 14 are the oppositely positioned, interleaved serrated plate members 25 and 26 secured respectively to the bottom and top walls of the outlet duct, defining therebetween a zig-zag discharge orifice for the air leaving the blower. Said discharge orifice serves to diffuse the air and to cooperate with the baffle members 22, 22 to distribute the air so that it strikes the sieve 12 at the under side of said sieve with substantially equal velocity over the area of the sieve.

In operation, air is drawn into the blower casing through the inlet openings 18, 18 and is propelled against the baffle elements 22, 22 by the counterclockwise rotation of the blower vanes 21, as viewed in Figures 1 and 2. The air is forced through the outlet duct 14 and discharges therefrom between the opposing serrated plate members 25 and 26, being diffused thereby against the under side of the sieve 12, the diffusion of the air being produced by the combined action of the forwardly converging baffle members 22, 22 and the opposing serrated plate members 25 and 26. However, even if the opposing plate members 25 and 26 were not present, or if the spacing between said opposing plate members were very substantial the baffle members 22, 22 would still serve to deflect the moving air in a manner to provide a diffusion action thereof as the air is discharged from the outlet duct 14, whereby the air would be more evenly distributed in velocity as it engages the under side of the said member 12, than if the deflecting baffle members 22, 22 were not employed.

While a specific embodiment of an improved blower assembly for use in a grain separator has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a grain separator, a generally cylindrical horizontal air blower casing having vertical end walls and including a bottom wall, said casing having an air outlet duct directed upwardly from the bottom portion of said casing and being rigid with and merging with said bottom wall, a horizontal vaned rotor rotatably mounted in said blower casing, said casing having air inlet openings at its respective end walls, and a pair of air deflecting baffle members mounted on the bottom wall of the casing and converging toward and extending into the bottom of said air outlet duct.

2. In a grain separator, a generally cylindrical horizontal air blower casing having vertical end walls and including a bottom wall, said casing having an air outlet duct directed upwardly from the bottom portion of said casing and being rigid with and merging with said bottom wall, a horizontal vaned rotor rotatably mounted in said blower casing, said casing having air inlet openings at its respective end walls, and a pair of air deflecting baffle members mounted on the bottom wall of the casing and extending along the bottom wall of the casing from points rearwardly adjacent said air inlet openings to points in the intermediate portion of the air outlet duct and converging toward said outlet duct.

3. In a grain separator, a generally cylindrical horizontal air blower casing having vertical end walls and including a bottom wall, said casing having an air outlet duct directed upwardly from the bottom portion of said casing and being rigid with and merging with said bottom wall, a horizontal vaned rotor rotatably mounted in said blower casing, said casing having air inlet openings at its respective end walls, and respective sinuously curved deflecting baffle members of substantially inverted V shape mounted on the bottom wall of the casing and extending convergently along the bottom wall of the casing and extending convergently along the bottom wall of the casing toward the outlet duct from points rearwardly adjacent said air inlet openings into the bottom of said air outlet duct, the horizontal spacing between the forward end portions of said baffle members being substantially less than the length of the rotor vanes.

4. In a grain separator, a generally cylindrical horizontal air blower casing having vertical end walls and including a bottom wall, said casing having an air outlet duct directed upwardly from the bottom portion of said casing and being rigid with and merging with said bottom wall, a horizontal vaned rotor rotatably mounted in said blower casing, said casing having air inlet openings at its respective end walls, respective sinuously curved deflecting baffle members of substantially inverted V shape mounted on the bottom wall of the casing and extending convergently along the bottom wall of the casing toward the outlet duct from points rearwardly adjacent said air inlet openings into the bottom of said air outlet duct, the horizontal spacing between the forward end portions of said baffle members being substantially less than the length of the rotor vanes, and means defining a transversely extending horizontal discharge orifice having a generally zig-zag shape mounted in the outlet duct at the discharge ends of said baffle members.

References Cited in the file of this patent

UNITED STATES PATENTS

| | | |
|---|---|---|
| 236,340 | Krake | Jan. 4, 1881 |
| 1,133,942 | Di Salvio | Mar. 30, 1915 |
| 1,850,545 | Gredell | Mar. 22, 1932 |
| 2,272,148 | Dray | Feb. 3, 1942 |

FOREIGN PATENTS

| | | |
|---|---|---|
| 430,955 | Great Britain | June 27, 1935 |